Oct. 28, 1941.  W. D. SHAFFER  2,260,542
HIGH PRESSURE FLANGE PACKING
Filed June 24, 1940

Inventor,
W. D. Shaffer;
By his Attorney
Frederick E. Maynard.

Patented Oct. 28, 1941

2,260,542

UNITED STATES PATENT OFFICE 2,260,542

HIGH PRESSURE FLANGE PACKING

William D. Shaffer, Brea, Calif.

Application June 24, 1940, Serial No. 342,094

2 Claims. (Cl. 285—137)

This invention is a high-pressure fluid packer, which is very adaptable to meeting flanges of pipe or other equipment, and well adaptable for the packing of various parts having seams subject to high fluid pressures.

It has been proposed to cut circular grooves with slightly flared side walls, in flange faces, and to force into the grooves of such opposed parts a hard metal ring with oval or wedge surfaces to make an annular line of contact in the opposite grooves to effect a packing seal. This contrivance has several practical objections; one being that it is necessary to exert a high tensile strain on the bolts or screws used to tighted up the joint, as well as on the threads thereof, and another is that if the joint has to be knocked down and then made up again it is found substantially impossible to set the ring back in the identical annular point of register that it first had and therefore any distortion of the ring at its first seating will make it practically impossible to again make a tight seat with the same ring.

Another design that is old and well known consists of hydraulic packing sunk in a groove in one part and the packing is bolted down against a flat face on an opposite part: but the device will not hold under pressures of fluid over 4000 pounds pressure per square inch.

Still another packing expedient involves the cutting of a circular groove in one part and the use of an annular bead on an opposed part whereby to flex into the groove a flexible packing ring interposed against the bead: this type requires a pair of matched groove and bead parts for each joint and does not allow of interchangeability among a number without matching.

It is an object of the instant invention to provide a joint device which will eliminate the several objections to the above mentioned types of packings and will incorporate such important features as:

(1) A pair of duplicate flanges adapted to be readily fastened together without the requirement of excessive tensile strain on the bolts or screws and in which a packing medium is wholly countersunk to avoid being blown out laterally by the pressure of fluid.

(2) A packing of such structure that may be re-assembled easily and effectively without need of attention to annular register of the packing medium, and will reliably hold against the given or expected high pressures.

(3) A packing including opposeable parts, such as flanges, preferably of entirely interchangeable character such as having like ring receiving grooves to receive interchangeable packing rings and interchangeable presser rings.

(4) A packing assembly incorporating a presser ring one side of which is adapted for direct contact with a tapered-wall groove in one part whilst the other side (axially from the first) is flatted for operation on a flat faced ring packing.

An object, which has been successfully accomplished by this invention, is the provision of a practical, low cost, substantial, easily made-up packer device which will be effective under service, fluid pressures ranging from 6000 to 10000 pounds per square inch.

The invention consists in certain advancements in this art as set forth in the ensuing disclosure and having, with the above, additional objects and advantages as hereinafter developed, and whose construction, combinations and details of means, and the manner of operation will be made manifest in the description of the herewith illustrative embodiments; it being understood that modifications, variations and adaptations may be resorted to within the spirit, scope and principle of the invention as it is more directly claimed hereinbelow.

Figure 1:
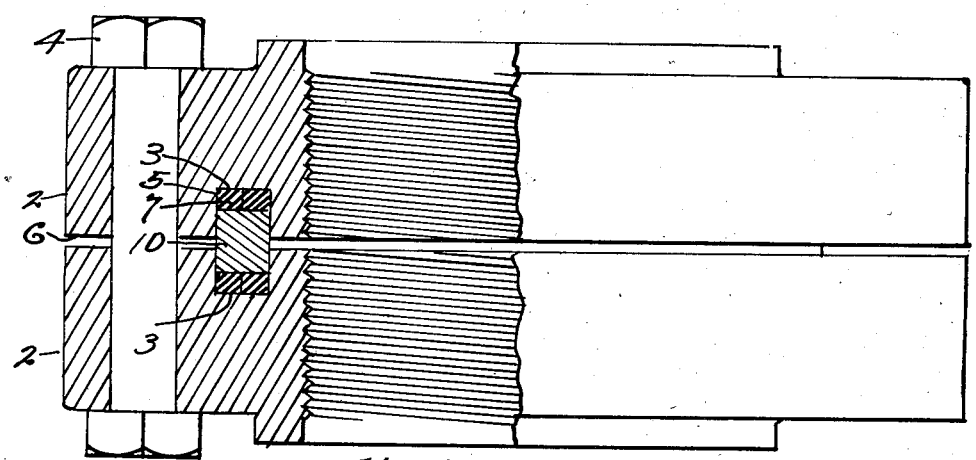
Figure 1 is a partial, axial section of a preferred form of the flange union, packer assembly.

The packer of Fig. 1 embodies a pair of duplicate, union flanges 2—2 each having apposite annular grooves 3 in their adjacent faces, and are adapted to be clamped by suitable means; bolts 4 being shown here. The grooves 3 preferably have side walls 5 which are perpendicular to the adjacent faces 6 of the flanges. It is one of the noticeable features of this invention that the side walls of the grooves of the flanges 2 do not have to be precision-machined, and the duplicity of the flanges permits them to be permiscuously interchanged in any remake-up of several joints.

The grooves 3 are sufficiently deep to fully countersink appropriate hydraulic, or other preferred but ductile, packing rings 7 to such a depth that an interposed presser ring 10 will telescope somewhat into the grooves 3 of the assembled flanges 2 so that no noticeable area of the packing 7 will be exposed to the fluid to be sealed at the union; it being understood that the presser rings 10 have a sliding fit into the grooves without undue play of the rings 10 radially as to the union.

When the packer of Fig. 1 is made up the intermediate presser ring 10 acts with equal pressure on the bedded packing rings 7 in the annular grooves 3 and the packing rings are compressed until they flow solidly against the side walls of the grooves. It will be seen that this union can be knocked down and later made up without any regard to the possibility that the elements of several such unions may have become thoroughly intermixed on the shop or field service area and an effective sealed joint completed in a manner not possible where the joint is of the type having a hard, finely machined ring to seat on converging-faced grooves of precision machining where a very slight distortion of the ring will defeat sealing off the seam or joint.

Figure 2:
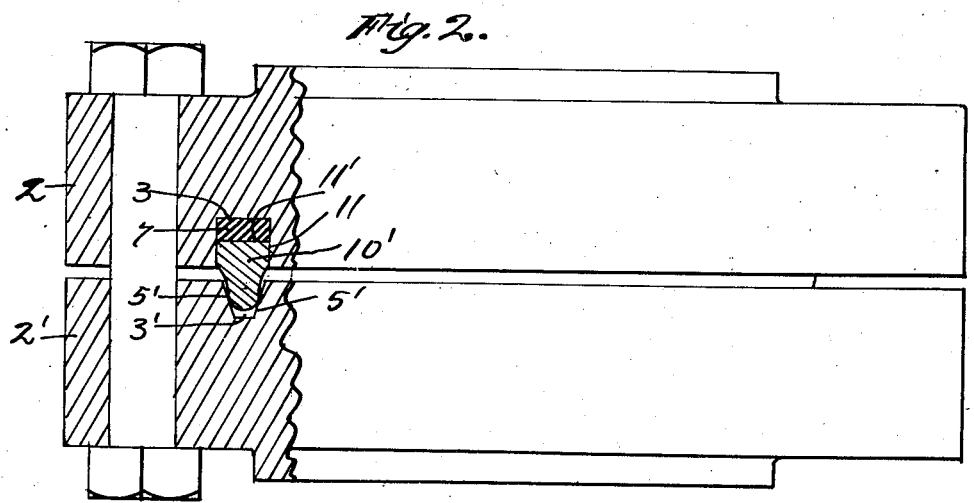
Figure 2 is a partial, axial section of a modified form of the packer in which an adaptor presser ring is incorporated.

In Fig. 2 there is shown a flanged union including flanges 2 and 2' one having a groove 3 as above set forth for a hydraulic ring 7 and the other flange has a groove 3' with inwardly converging side walls 5'. In event that an installed equipment or a store room stock includes a number of the flanges of the type with grooves 3' (tapered wall) and it is desired to equip or stock up with flanges 2 having grooves 3 there is here provided an adaptor presser ring 10' of T-cross section with the head 11 presenting an outer, flat face 11' to engage bedded packing 7 in the flange groove 3 whilst the stem 12 of the ring 10' is of converging form to jam by annular lines of contact on the wall of the tapered groove 3'. Thus by the adaptor ring 10' at least one side of the joint embodies a fully seated, bottom and side wall packing 7 leaving only a 50% hazard for leak at the opposite side of the ring 10' where a hard metal (part 12) is depended on to seal, by line contact only, in the tapered groove 3'.

What is claimed is:

1. A high-pressure fluid packing assembly including a pair of coaxial flange members having annular grooves in adjacent faces and which have concentric wall faces parallel to the flange axis; unattached and readily removable, ductile packing rings bottomed in the grooves and being of materially less depth than the depth of the grooves; a harder presser ring element extending from flange to flange and into and slidably fitting the side walls of the grooves and having end faces substantially covering the said bedded packing and preventing extrusion of the packing under pressure, and clamp means for drawing up the flanges and compressing the ring element onto the packings.

2. In a high-pressure flange union: a pair of flanges having opposed faces one of which has an annular groove having concentric, axially parallel walls, an unattached, ductile packing material bedded in the groove, and an unattached compression element which slidably fits in the walls of the groove and covers the packing to prevent its extrusion, and clamp means to clinch up the flanges.

WILLIAM D. SHAFFER.